US008758288B2

(12) United States Patent  (10) Patent No.: US 8,758,288 B2
Manzella, Jr. et al.  (45) Date of Patent: Jun. 24, 2014

(54) GASKET FOR USE WITH FLUID PROCESSING CASSETTE

(75) Inventors: Salvatore Manzella, Jr., Barrington, IL (US); Timothy Getschman, Kenosha, WI (US)

(73) Assignee: Fenwal, Inc., Lake Zurich, IL (US)

( * ) Notice: Subject to any disclaimer, the term of this patent is extended or adjusted under 35 U.S.C. 154(b) by 425 days.

(21) Appl. No.: 13/012,034

(22) Filed: Jan. 24, 2011

(65) Prior Publication Data

US 2011/0181004 A1   Jul. 28, 2011

Related U.S. Application Data

(60) Provisional application No. 61/297,926, filed on Jan. 25, 2010.

(51) Int. Cl.
*A61M 37/00* (2006.01)
*A61M 1/00* (2006.01)
*F16J 15/06* (2006.01)
*F16K 27/00* (2006.01)

(52) U.S. Cl.
CPC ............. *F16K 27/003* (2013.01); *F16J 15/064* (2013.01)
USPC .............................. 604/6.1; 604/6.11; 604/29

(58) Field of Classification Search
USPC ............... 277/630, 637; 604/61, 6.11, 6.1, 29
See application file for complete search history.

(56) References Cited

U.S. PATENT DOCUMENTS

| | | | | | |
|---|---|---|---|---|---|
| 3,615,257 | A | * | 10/1971 | Frost et al. | 422/534 |
| 4,642,098 | A | * | 2/1987 | Lundquist | 604/123 |
| 5,350,357 | A | * | 9/1994 | Kamen et al. | 604/29 |
| 5,438,510 | A | * | 8/1995 | Bryant et al. | 604/29 |
| 5,474,683 | A | * | 12/1995 | Bryant et al. | 210/646 |
| 5,628,908 | A | * | 5/1997 | Kamen et al. | 210/646 |
| 5,634,896 | A | * | 6/1997 | Bryant et al. | 604/29 |
| 5,868,696 | A | * | 2/1999 | Giesler et al. | 604/6.12 |
| 7,004,727 | B2 | * | 2/2006 | Kline et al. | 417/46 |
| 7,736,328 | B2 | * | 6/2010 | Childers et al. | 604/29 |
| 7,775,213 | B2 | | 8/2010 | Henke-sarmento | |
| 7,935,074 | B2 | * | 5/2011 | Plahey et al. | 604/29 |
| 8,197,439 | B2 | * | 6/2012 | Wang et al. | 604/67 |
| 8,328,758 | B2 | * | 12/2012 | Childers et al. | 604/131 |
| 2003/0222029 | A1 | * | 12/2003 | Muller | 210/739 |
| 2008/0015493 | A1 | * | 1/2008 | Childers et al. | 604/29 |
| 2008/0128993 | A1 | * | 6/2008 | Blakeley et al. | 277/312 |
| 2008/0309027 | A1 | * | 12/2008 | Rogeon et al. | 277/653 |
| 2009/0112151 | A1 | * | 4/2009 | Chapman et al. | 604/29 |
| 2011/0071465 | A1 | * | 3/2011 | Wang et al. | 604/67 |

* cited by examiner

*Primary Examiner* — Kristina Fulton
*Assistant Examiner* — Nicholas L Foster
(74) *Attorney, Agent, or Firm* — Cook Alex Ltd.

(57) ABSTRACT

A gasket member is provided for use with a fluid processing cassette having a plurality of valve stations and a fluid processing system having a valve assembly with a plurality of valve actuators. The valve stations and valve actuators are positioned in discrete locations, with the location of each valve station corresponding to the location of an associated valve actuator. The gasket member includes a filter layer and a support layer, the support layer being made of a support material. The support layer includes discrete portions of support material corresponding generally to the discrete locations of the valve stations and the valve actuators.

20 Claims, 10 Drawing Sheets

GASKET FOR USE WITH FLUID PROCESSING CASSETTE

CROSS REFERENCE TO RELATED APPLICATIONS

This application claims priority from and the benefit of provisional patent application Ser. No. 61/297,926, filed Jan. 25, 2010, which is hereby incorporated herein by reference.

BACKGROUND

1. Field of the Disclosure

The present subject matter relates to a cassette actuation assembly and an associated gasket member for use in combination with a fluid processing system.

2. Description of Related Art

Whole blood is routinely separated into its various components, such as red blood cells, platelets, and plasma. Conventional blood processing methods use durable centrifuge equipment in association with single use, sterile processing sets, typically made of plastic. The configuration of the single use processing sets used in combination with different centrifuges varies widely, but some sets include a molded plastic piece commonly referred to as a cassette. As used herein, the term "cassette" refers to a component of a blood processing system which includes a number of defined fluid passageways and valve stations. The cassette is secured to a cassette holder of the durable equipment. The cassette holder includes actuators for opening and closing the valve stations, which determine which of the fluid passageways are connected to each other, thereby directing fluid between a number of sources and destinations.

An exemplary cassette and cassette holder are employed by the AMICUS® system marketed by Fenwal, Inc. of Lake Zurich, Ill. One version of the AMICUS® system is described in greater detail in U.S. Pat. No. 5,868,696, which is hereby incorporated herein by reference. In the AMICUS® system, fluid flow is controlled by a disposable cassette with preformed fluid passages, which interfaces with an array of actuators and sensors located on a panel of the durable reusable hardware. The cassette has a flexible membrane on the side facing the actuators and sensors. In the prior device, vacuum is applied by the hardware through small spaced-apart apertures to draw the membrane into contact with the surface of the array and with the sensors therein for more reliant and accurate sensing. Specifically, a thin, elastomeric membrane or gasket is associated with the cassette holder of the AMICUS® system and covers all of the actuators. The gasket protects the actuators from liquids, dust, and other debris that could otherwise interfere with the performance of the actuators. However, the gasket described in U.S. Pat. No. 5,868,696 is simplistic (being a plain sheet of elastomeric material and a hydrophobic material therebelow) and the need exists for an improved gasket which adequately shields the relevant portions of the cassette holder while providing additional functionality during blood processing procedures.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In one aspect, a gasket member is provided for use with a fluid processing cassette having a plurality of valve stations positioned in discrete locations. The gasket member comprises a filter layer and a support layer, the support layer being present in discrete areas or portions corresponding generally to the discrete locations of the valve stations of the cassette.

In another aspect, a gasket member is provided for use with a fluid processing system having a valve assembly with a plurality of valve actuators positioned in discrete locations. The gasket member comprises a filter layer and a support layer, the support layer being present in discrete areas or portions corresponding generally to the discrete locations of the valve actuators of the valve assembly.

DESCRIPTION OF THE ILLUSTRATED EMBODIMENTS

The embodiments disclosed herein are for the purpose of providing the required description of the present subject matter. They are only exemplary, and may be embodied in various forms. Therefore, specific details disclosed herein are not to be interpreted as limiting the subject matter as defined in the accompanying claims.

Figure 1:
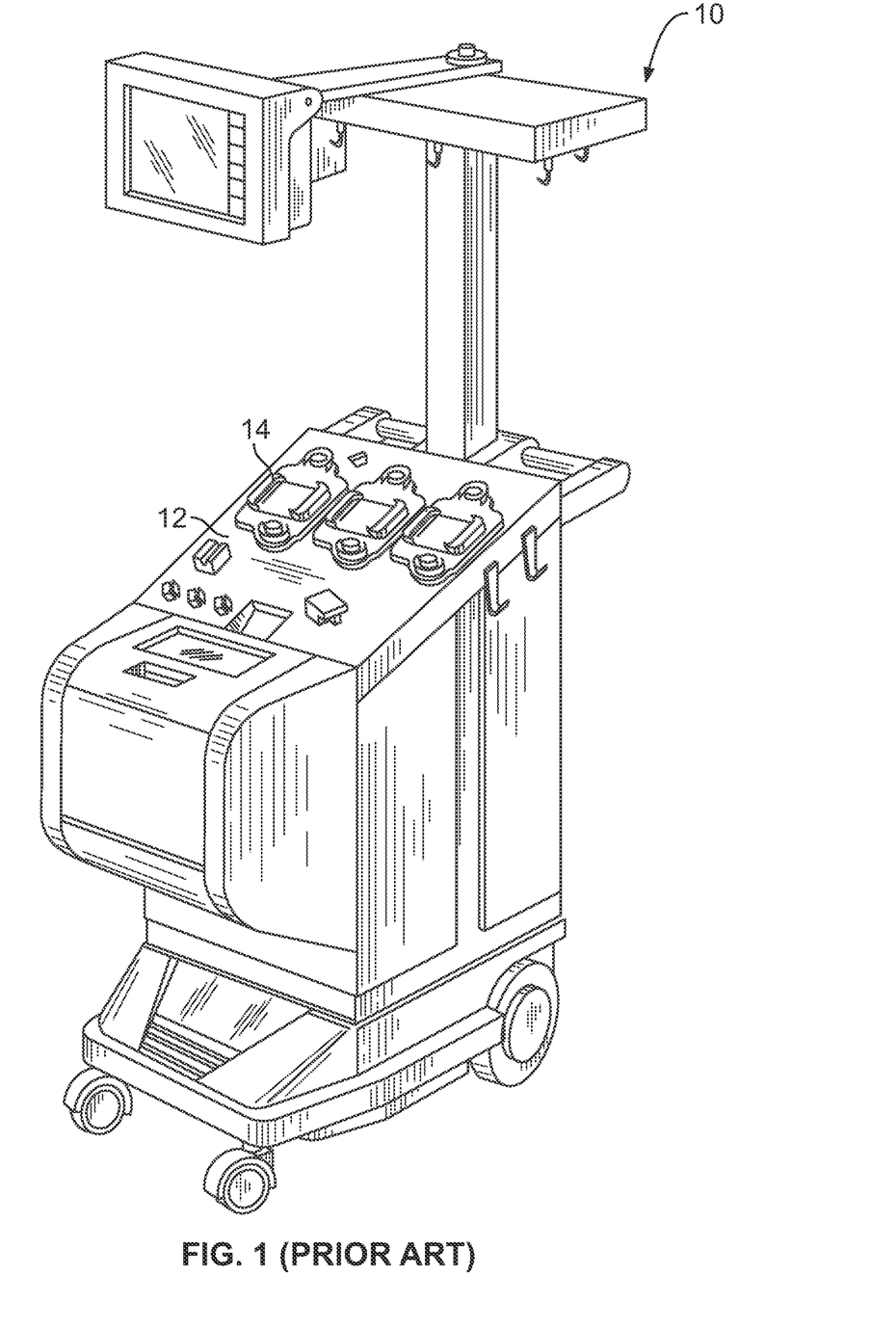
FIG. 1 is a perspective view of an exemplary durable fluid processing centrifuge system that may be used in combination with gasket members according to the present disclosure.

FIG. 1 shows a known centrifugal fluid processing system 10 that may be used in combination with gasket members according to the present disclosure. The system is currently marketed as the AMICUS® separator by Fenwal, Inc. of Lake Zurich, Ill. The system 10 can be used for processing various fluids, but is particularly well suited for processing whole blood and other suspensions of biological cellular materials. The system 10 includes a centrifuge chamber (not visible) suitable for separating a fluid into its components based on the density of such components. A more detailed description of the centrifuge and the other elements of the system 10 can be found in U.S. Pat. No. 5,868,696, which is incorporated by reference herein.

A sloped front panel 12 of the system 10 includes at least one cassette holder 14 (FIG. 2), which is configured to receive and grip a cassette 16 (FIGS. 3 and 4) of a disposable, single use processing set.

Figures 3, 4:
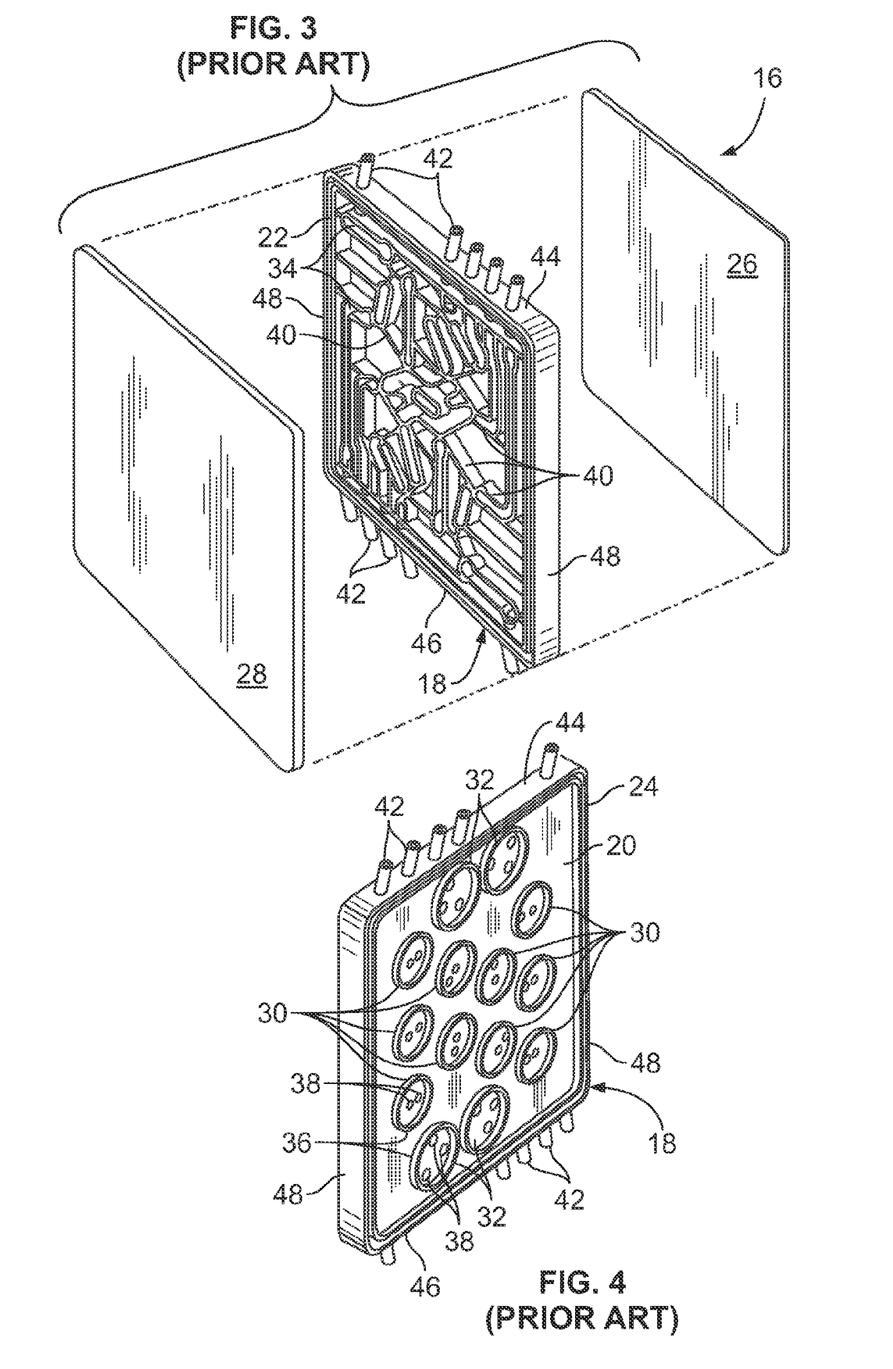
FIG. 3 is an exploded perspective view of an exemplary disposable fluid processing cassette that may be used in combination with the fluid processing system of FIG. 1 and gasket members according to the present disclosure.
FIG. 4 is a perspective view of an underside of the fluid processing cassette of FIG. 3.

The cassette 16, as shown in FIGS. 3 and 4, includes an injection molded body 18 that is compartmentalized by an interior wall 20 (FIG. 4) to present or form a topside 22 (FIG. 3) and an underside 24 (FIG. 4). For the purposes of description, the topside 22 is the side of the cassette 16 that, in use, faces away from the system 10, while the underside 24 faces towards the system 10. A flexible diaphragm 26 overlies and peripherally seals the underside 24 of the cassette 16. A generally rigid upper panel 28 overlies the topside 22 of the cassette 16 and is sealed peripherally and to the raised channel-defining walls in the cassette 16, as described later.

In one embodiment, the cassette 16, the interior wall 20, and the upper panel 28 are made of a rigid medical grade plastic material, while the diaphragm 26 is made of a flexible sheet of medical grade plastic. The upper panel 28 and the diaphragm 26 are sealed about their peripheries to the peripheral edges of the top- and undersides 22, 24 of the cassette 16, respectively.

As shown in FIGS. 3 and 4, the top- and undersides 22, 24 of the cassette 16 contain preformed cavities. On the underside 24 of the cassette 16 (FIG. 4), the cavities form an array of valve stations 30 and an array of pressure sensing stations 32. On the topside 22 of the cassette 16 (FIG. 3), the cavities form an array of channels or paths 34 for conveying liquids. The valve stations 30 communicate with the liquid paths 34 through the interior wall 20 to interconnect them in a predetermined manner. The sensing stations 32 also communicate with the liquid paths 34 through the interior wall 20 to sense pressures in selected regions. The number and arrangement of the liquid paths 34, the valve stations 30, and the sensing stations 32 can vary. In the illustrated embodiment, the cassette 16 provides nineteen liquid paths 34, ten valve stations 30, and four sensing stations 32.

The valve and sensing stations 30, 32 resemble shallow wells open on the cassette underside 24 (FIG. 4). Upstanding edges 36 rise from the interior wall 20 and peripherally surround the valve and sensing stations 30, 32. The valve stations 30 are closed by the interior wall 20 on the topside 22 of the cassette 16, except that each valve station 30 includes a pair of through holes or ports 38 in the interior wall 20. The ports 38 each open into selected different liquid paths 34 on the topside 22 of the cassette 16.

The sensing stations 32 are likewise closed by the interior wall 22 on the topside 22 of the cassette 16, except that each sensing station 32 includes three through holes or ports 38 in the interior wall 20 (FIG. 4). The ports 38 open into selected liquid paths 34 on the topside 22 of the cassette 16. These ports 38 channel liquid flow among the selected liquid paths 34 through the associated sensing station 32.

In one embodiment, the flexible diaphragm 26 overlying the underside 24 of the cassette 16 is sealed by ultrasonic welding to the upstanding peripheral edges 36 of the valve and sensing stations 30, 32. This isolates the valve stations 30 and sensing stations 32 from each other and the rest of the system. In an alternative embodiment, the flexible diaphragm 26 can be seated against the upstanding edges 36 by an external positive force applied by the cassette holder 14 against the diaphragm 26. The positive force, like the ultrasonic weld, peripherally seals the valve and sensing stations 30, 32.

The localized application of additional positive force (referred to herein as a "closing force") upon the intermediate region of the diaphragm 26 overlying a valve station 30 serves to flex the diaphragm 26 into the valve station 30. Such closing force is provided by the cassette holder 14, as will be described in greater detail herein. The diaphragm 26 seats against one of the ports 38 to seal the port 38, which closes the valve station 30 to liquid flow. Upon removal of the closing force, fluid pressure within the valve station 30 and/or the plastic memory of the diaphragm 26 itself unseats the diaphragm 26 from the port 38, opening the valve station 30 to liquid flow. Most advantageously, the diameter and depth of the valve stations 30 are selected so that the flexing required to seat the diaphragm 26 does not exceed the elastic limits of the diaphragm material. In this way, the plastic memory of the plastic material alone is sufficient to unseat the diaphragm 26 in the absence of the closing force.

Upstanding channel sides or edges 40 rise from the interior wall 20 to peripherally surround and define the liquid paths 34, which are open on the topside 22 of the cassette 16. The liquid paths 34 are closed by the interior wall 20 on the underside 24 of the cassette 16, except for the ports 38 of the valve and sensing stations 30, 32 (FIG. 4). The rigid panel 28 overlying the topside 22 of the cassette 16 is sealed by ultrasonic welding to the upstanding peripheral edges 40, sealing the liquid paths 34 from each other and the rest of the system.

In the illustrated embodiment, ten premolded tube connectors 42 extend out along opposite side edges 44, 46 of the cassette 16. The tube connectors 42 are arranged five on one side edge 44 and five on the other side edge 46. The other side edges 48 of the cassette 16, as illustrated, are free of tube connectors. The tube connectors 42 are associated with external tubing (not illustrated) to associate the cassette 16 with the remainder of the system.

The tube connectors 42 communicate with various interior liquid paths 34, which constitute the liquid paths of the cassette 16 through which a fluid enters or exits the cassette 16. The remaining interior liquid paths 34 of the cassette 16 constitute branch paths that link the liquid paths 34 associated with the tube connectors 42 to each other through the valve stations 30 and sensing stations 32.

Figure 11:
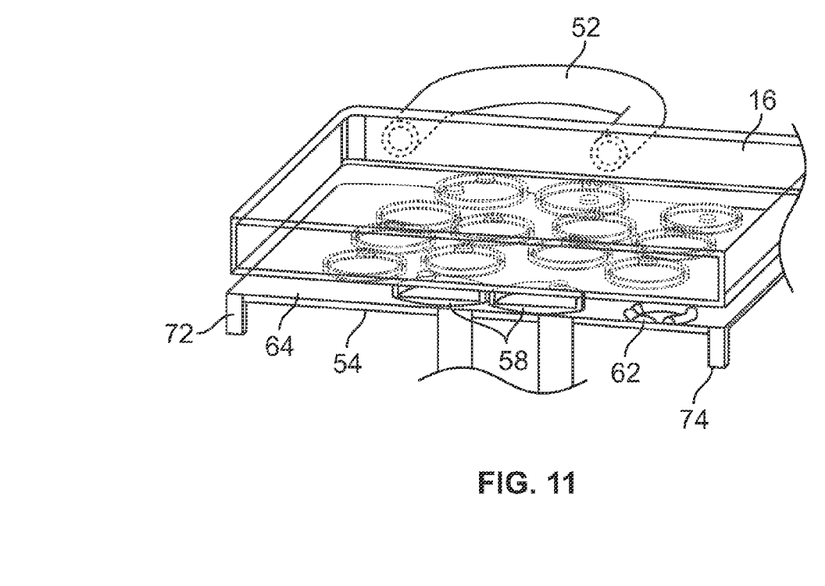
FIG. 11 is a cross-sectional perspective view of the cassette holder of FIG. 2 overlaid by the gasket member of FIG. 5 and the fluid processing cassette of FIG. 3.

Turning now to the cassette holder 14 (FIG. 2), it receives and grips the cassette 16 along the two opposed sides edges 48 in the desired operating position. The cassette holder 14 includes a pair of peristaltic pump stations 50. When the cassette 16 is gripped by the cassette holder 14, tubing loops 52 extending from the cassette 16 (FIG. 11) make operative engagement with the pump stations 50. The pump stations 50 are operated to cause fluid flow through the cassette 16.

Figure 12:
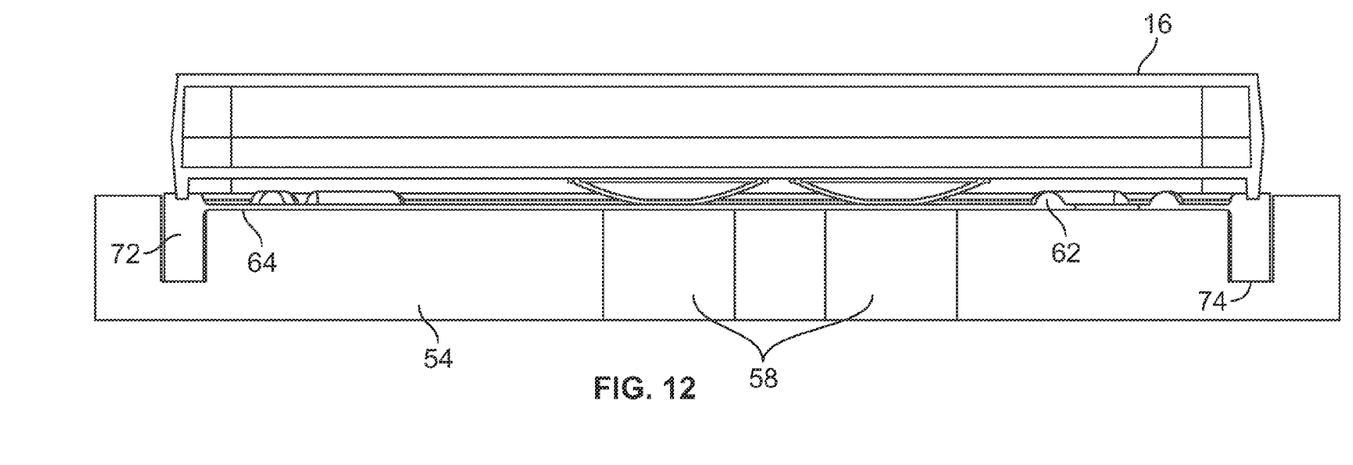
FIG. 12 is a diagrammatic cross-sectional view of the cassette holder of FIG. 2 overlaid by the gasket member of FIG. 5 and the fluid processing cassette of FIG. 3.

The flexible diaphragm 26 covering the underside 24 of the cassette 16 is urged into intimate contact with a valve and sensor array or assembly 54 by the cassette holder 14 (FIGS. 11 and 12) The valve assembly 54 acts in concert with the valve stations 30 and sensing stations 32 of the cassette 16. The valve assembly 54 illustrated in FIG. 2 includes ten valve actuators 56 and four pressure sensing transducers 58. The valve actuators 56 and the pressure sensing transducers 58 are mutually arranged in the same layout as the valve stations 30 and sensing stations 32 on the underside 24 of the cassette 16. When the cassette 16 is gripped by the cassette holder 14, the valve actuators 56 align with the cassette valve stations 30. At the same time, the pressure sensing transducers 58 mutually align with the cassette sensing stations 32.

In one embodiment, each valve actuator 56 includes an electrically actuated solenoid pin or piston 60. Each piston 60 is independently movable between an extended position and a retracted position. When in its extended position, the piston 60 presses against the region of the diaphragm 26 that overlies the associated valve station 30. In this position, the piston 60 flexes the diaphragm 26 into the associated valve station 30, thereby sealing the associated valve port 38. This closes the valve station 30 to liquid flow. When in its retracted position, the piston 60 does not apply force against the diaphragm 26. As before described, the plastic memory of the diaphragm 26 unseats it from the valve port 38, thereby opening the valve station 30 to liquid flow.

The pressure sensing transducers 58 sense liquid pressures in the sensing stations 32 of the cassette 16. The sensed pressures are transmitted to a controller of the system 10 as part of its overall system monitoring function. The cassette holder 14 further includes a vacuum port 62 (FIG. 2) which provides suction to the diaphragm 26 of the cassette 16, drawing it into close contact with the transducers 58 for more accurate pressure readings.

A gasket member 64 (variously illustrated in FIGS. 5-8) covers the valve assembly 54, serving a number of functions. For example, as will be described in greater detail herein, the gasket member 64 includes regions which allow for air flow (so that the vacuum port 62 can provide the required suction to the diaphragm 26 of the cassette 16) while keeping liquids out of the valve assembly 54. Additionally, the gasket member 64 increases the durability of the system, including the valve stations 30 and covering diaphragm 26 of the cassette 16 as they are struck by the pistons 60 of the valve assembly 54.

In one embodiment, which is shown in FIGS. 5-10, the gasket member 64 comprises a support layer or body 66 and a filter layer 68 associated with the support layer 66 and covering substantially the entire underside of the support layer 66. Advantageously, the body 66 is comprised of a relatively durable elastomeric and/or polymeric material such as, but not limited to, a silicone material. As for the filter layer 68, it is most advantageously comprised of a hydrophobic material which allows the passage of air, but not liquid.

Figure 5:
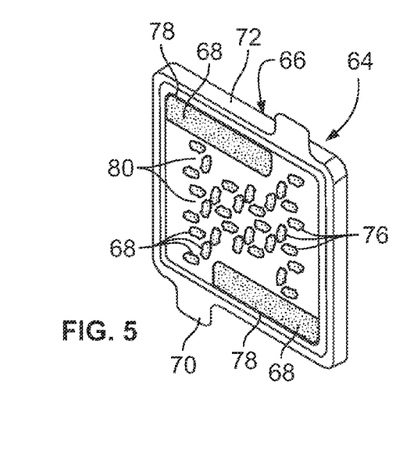
FIG. 5 is a perspective view of an embodiment of a gasket member according to the present disclosure.
Figure 6:
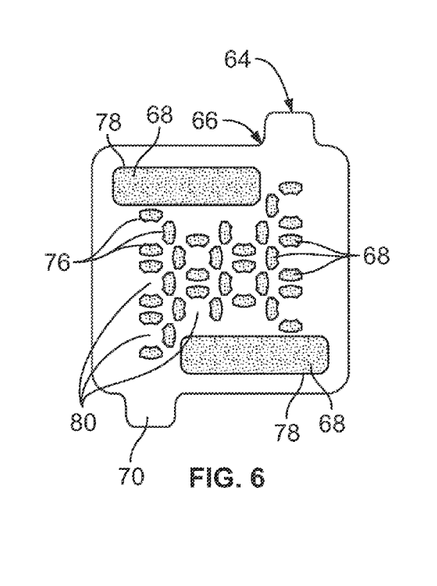
FIG. 6 is a front elevational view of the gasket member of FIG. 5.
Figure 7:
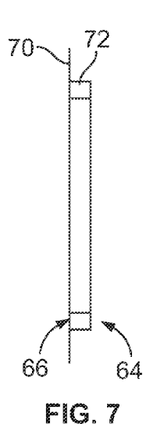
FIG. 7 is a left or front side elevational view of the gasket member of FIG. 5.

The body 66 is comprised of a face 70 and a frame 72. The frame 72 defines the perimeter of the face 70 and, in the illustrated embodiment, extends generally orthogonally away from the face 70, as shown in FIGS. 5 and 7. One function of the frame 72 is to be at least partially received by a groove 74 of the cassette holder 14 (FIGS. 11 and 12) to properly orient the gasket member 64 and maintain it in position during a fluid processing procedure.

Figure 8:
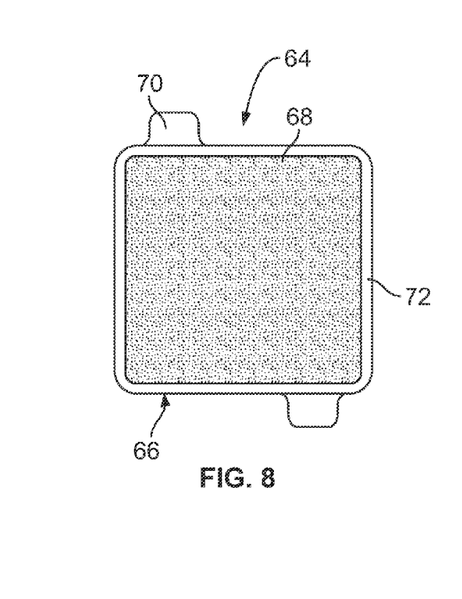
FIG. 8 is a rear elevational view of the gasket member of FIG. 5.

Together, the face 70 and frame 72 of the body 66 define a pocket or cavity in which the filter layer 68 is received, as shown in FIG. 8. The filter layer 68 illustrated in FIG. 8 comprises a solid sheet of material. In one embodiment, adhesive is applied to at least a portion of the filter layer 68 (e.g., the perimeter of the filter layer) and it is pressed into the pocket to adhere to the body 66. Other means of securing the filter layer 68 to the body 66 may also be employed without departing from the scope of the present disclosure. For example, the filter layer 68 may be secured by adhesive or otherwise to the full underside of the support layer 66 or may be adhered in selected locations in or around the areas associated with the valves or sensors.

Figure 9:
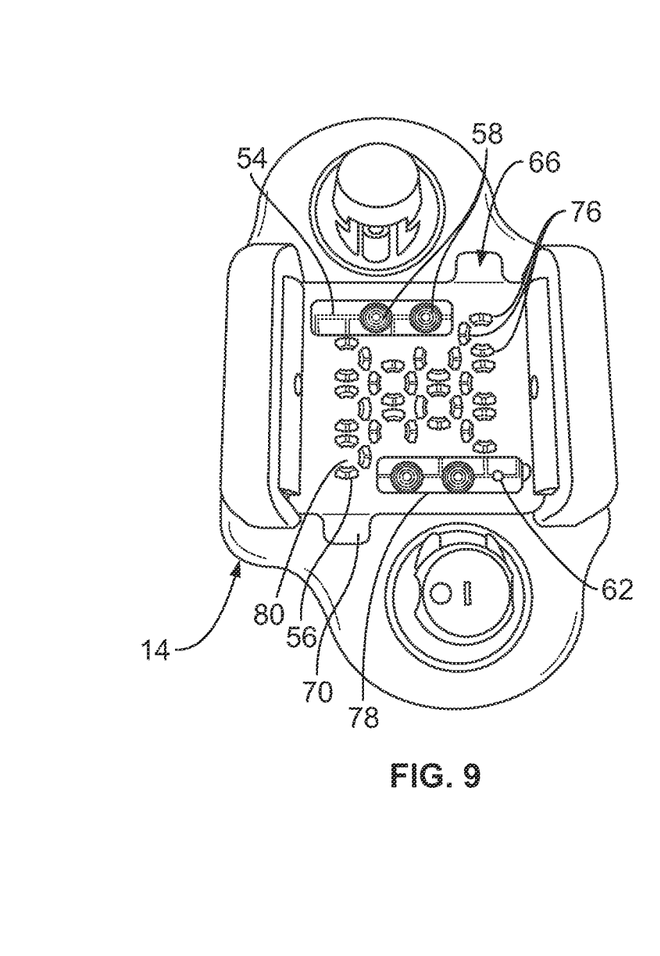
FIG. 9 is a perspective view of the cassette holder of FIG. 2 overlaid by the gasket member of FIG. 5, with a filter layer of the gasket member omitted for illustrative purposes.
Figure 10:
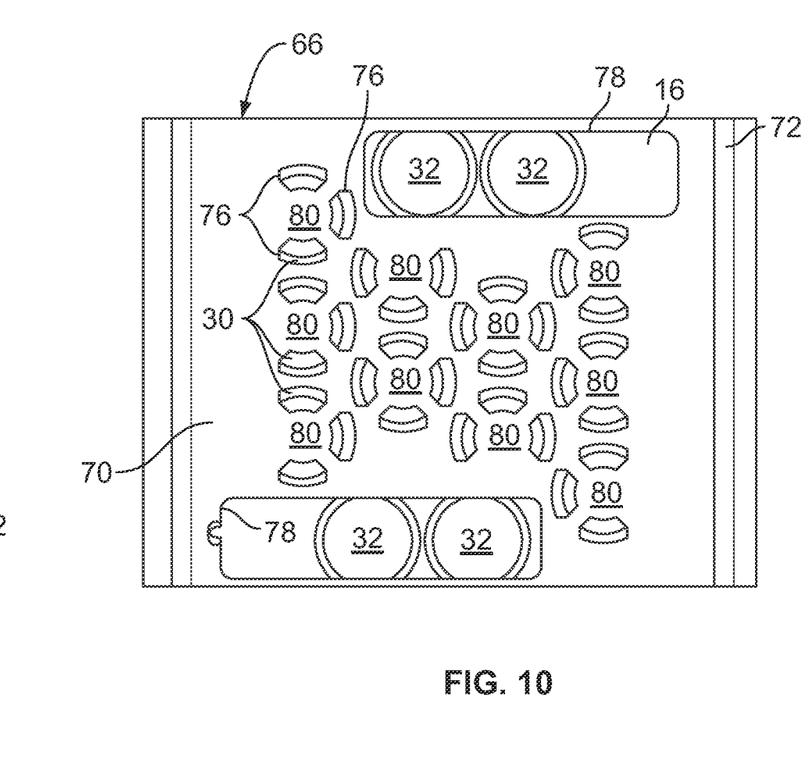
FIG. 10 is a rear elevational view of the fluid processing cassette of FIG. 3 overlaid by the gasket member of FIG. 5, with a filter layer of the gasket member omitted for illustrative purposes.

Whereas the illustrated filter layer 68 is a solid sheet of material, the face 70 of the body 66 includes various openings 76 and windows 78, as well as a number of discrete portions of support material 80. The discrete portions of support material 80 are particularly positioned so as to corresponding generally to the discrete locations of the valve stations 30 of the cassette 16 and the valve actuators 56 of the valve assembly 54. For example, FIGS. 9 and 10 show the body 66 of the gasket member 64, with the filter layer 68 being omitted for illustrative purposes. FIG. 9 shows the body 66 positioned so as to overlay the valve assembly 54 of the cassette holder 14, with one discrete portion of support material 80 overlaying each of the valve actuators 56. FIG. 10 shows the body 66 positioned so as to overlay the underside 24 of the cassette 16, with one discrete portion of support material 80 overlaying each of the valve stations 30 of the cassette 16.

As described previously in greater detail, the pistons 60 of the valve actuators 56 contact the valve stations 30 to regulate fluid flow through the cassette 16. Accordingly, providing the discrete portions of support material 80 between the valve actuators 56 and the valve stations 30 increases the durability of the gasket member 64 and the cassette diaphragm 26 overlying or adjacent to the valve stations 30. The discrete portions of support material 80 also protect the underlying filter layer 68 when the pistons 60 strike the valve stations 30.

Outside of the regions of the face 70 occupied by the discrete portions of support material 80, the face 70 illustrated in FIGS. 5-6 and 9-10 includes a number of openings 76 adjacent to or surrounding each discrete portion of support material 80. Such openings 76 allow air flow through the gasket member 64, so positioning them adjacent to the discrete portions of support material 80 allows for a vacuum to be applied (by the vacuum port 62 of the valve assembly 54) to the diaphragm 26 of the cassette 16, pulling the cassette 16 into closer contact with the valve and sensor array or assembly 54. While there is no support material in the openings 76, the filter layer 68 overlays or bridges the openings 76 to prevent liquid flow therethrough while allowing air flow therethrough.

In the illustrated embodiment, two of the openings in the face 70 are larger windows 78 positioned adjacent to two opposite edges of the face 70. The windows 78 are sufficiently sized to accommodate the pressure sensing transducers 58 and the vacuum port 62 of the valve assembly 54 (FIG. 9). Windows so configured are advantageous for a number of reasons. For example, an improved vacuum can be applied to the cassette 16 by the vacuum port 62 because the vacuum port 62 is not covered by support material of the gasket member 64. Also, the windows 78 allow for the interposition of only filter media (instead of filter media and support material) between the pressure sensing transducers 58 and the sensing stations 32 of the cassette 16 (FIG. 10). Having less material between the pressure sensing transducers 58 and the sensing stations 32 improves the accuracy of the measurements taken by the pressure sensing transducers 58.

Other embodiments of possible face configurations are illustrated in FIGS. 13-16. As with the embodiment of FIG. 6, each face includes discrete portions of support material corresponding generally to the discrete locations of the valve stations of the associated cassette and the valve actuators of the associated valve assembly.

Figure 13:
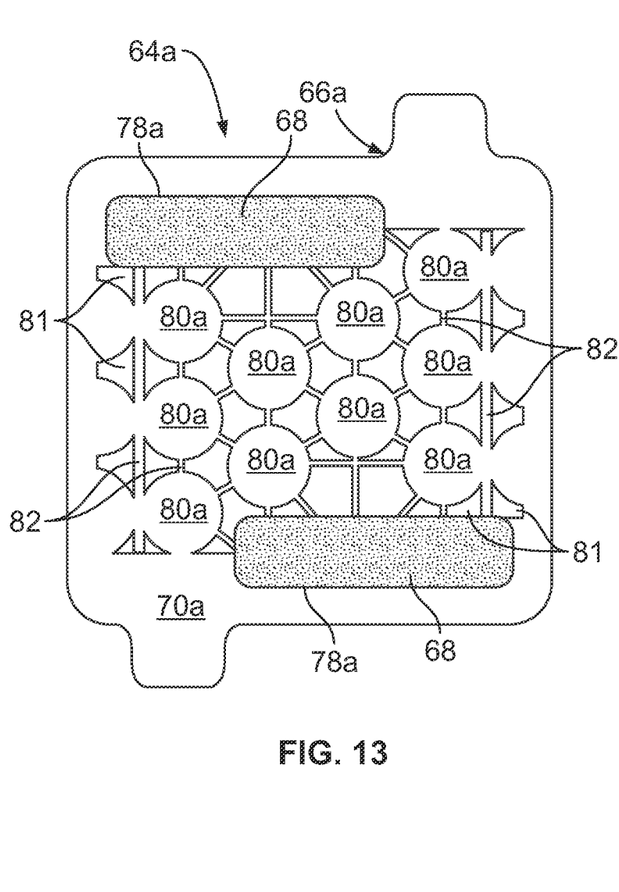
FIG. 13 is a front elevational view of an alternative embodiment of a gasket member according to the present disclosure.
Figure 13A:
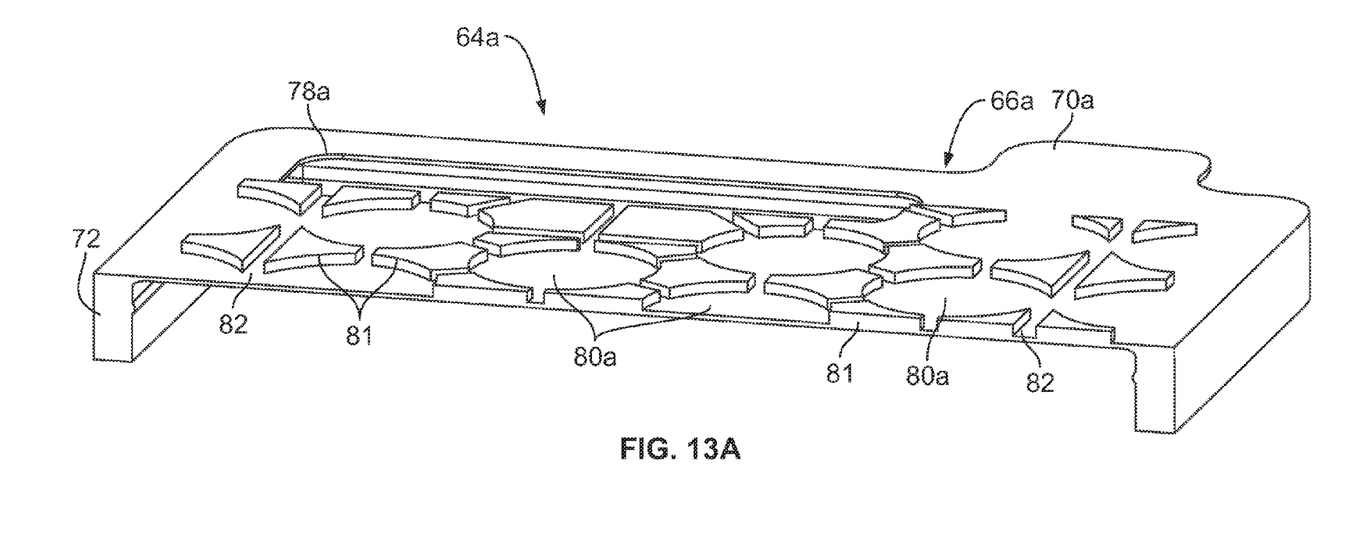
FIG. 13A is a cross-sectional perspective view of the gasket member of FIG. 13.
Figure 13B:
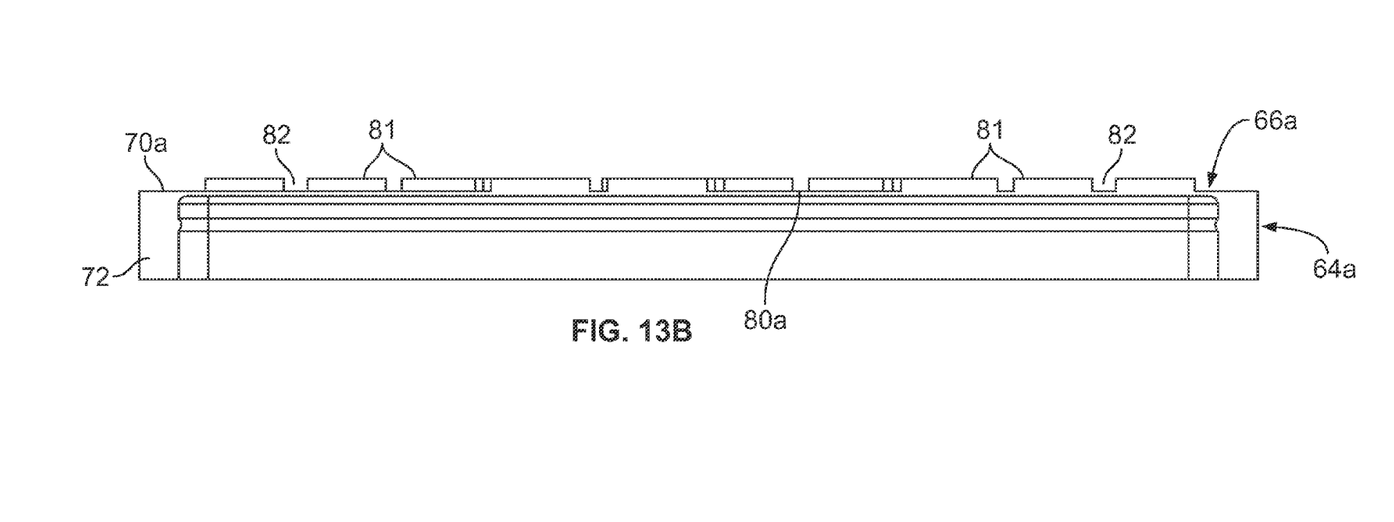
FIG. 13B is a cross-sectional end view of the gasket member of FIG. 13.

In the embodiment of FIGS. 13-13B, the gasket member 64a has a non-planar support layer 66a with a face 70a including a plurality of raised features 81, which define therebetween the various discrete portions of support material 80a and a network of channels 82. In the embodiment of FIGS. 13-13B, the only openings in the face 70a are the windows 78a, so those are the only locations where air may pass through the gasket member 64a to apply a vacuum to the cassette 16. However, each of the channels 82 and the discrete portions of support material 80a is directly or indirectly connected to the windows 78a, meaning that there will be air flowing through the channels 82 and the discrete portions of support material 80a above the support layer 66a, particularly in the same plane as the raised features 81. The suction applied by the vacuum port 62 is thereby applied to the cassette 16 in the locations of the channels 82 and the discrete portions of support material 80a. The raised features 81 may have any vertical thickness, but in one embodiment have a uniform thickness of approximately 0.040 inch.

As for the channels 82, they may have any width, but a number of factors may be considered when selecting a channel width. First, it may be advantageous for the channels 82 to be sufficiently narrow that the cassette diaphragm 26 does not drape down thereinto, thereby blocking air flow through the channel 82. On the other hand, it may also be advantageous to provide channels 82 which are sufficiently wide to promote adequate air flow therethrough. In one embodiment (paired with raised features 81 having a thickness of approximately 0.040 inch), the channels 82 are approximately 0.060 inch wide, which promotes air flow while preventing blockage. Different channels 82 may have different widths and individual channels 82 may have a varying width without departing from the scope of the present disclosure.

It will be seen that the discrete portions of support material 80a illustrated in FIGS. 13-13B are larger than the discrete portions of support material 80 illustrated in FIGS. 5-6 and 9-10. In particular, the discrete portions of support material 80a of FIGS. 13-13B cover approximately the same area as the discrete portions of support material 80 and surrounding openings 76 shown in FIGS. 5-6 and 9-10. This is because the discrete portions of support material 80a of FIGS. 13-13B provide the combined functions of the discrete portions of support material 80 (i.e., acting as an additional layer between the associated valve station 30 and filter layer 68 to protect both) and the openings 76 (i.e., providing a suction to the region of the cassette diaphragm 26 adjacent the valve station 30) of FIGS. 5-6 and 9-10.

Figure 14:
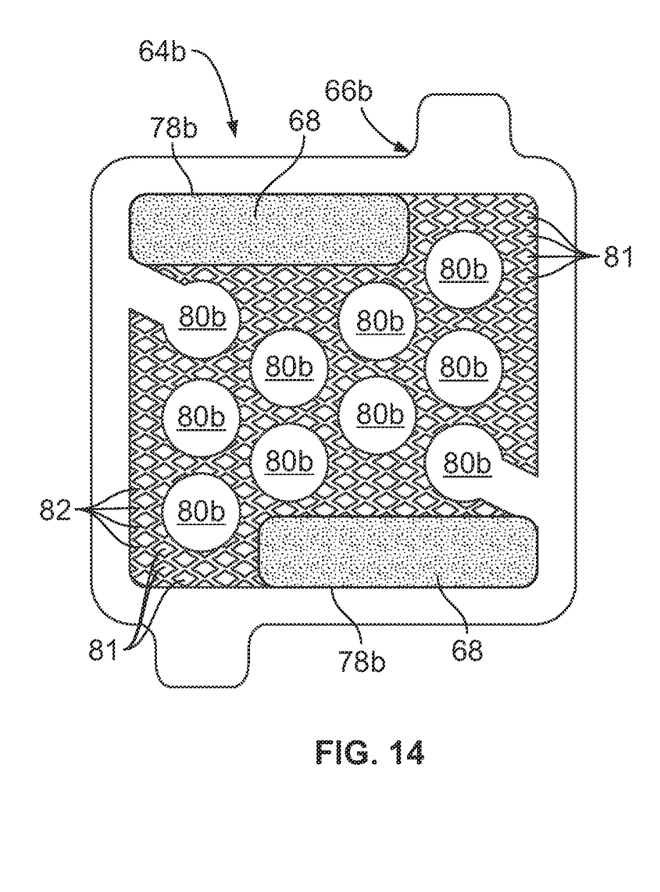
FIG. 14 is a front elevational view of another alternative embodiment of a gasket member according to the present disclosure.
Figure 14A:
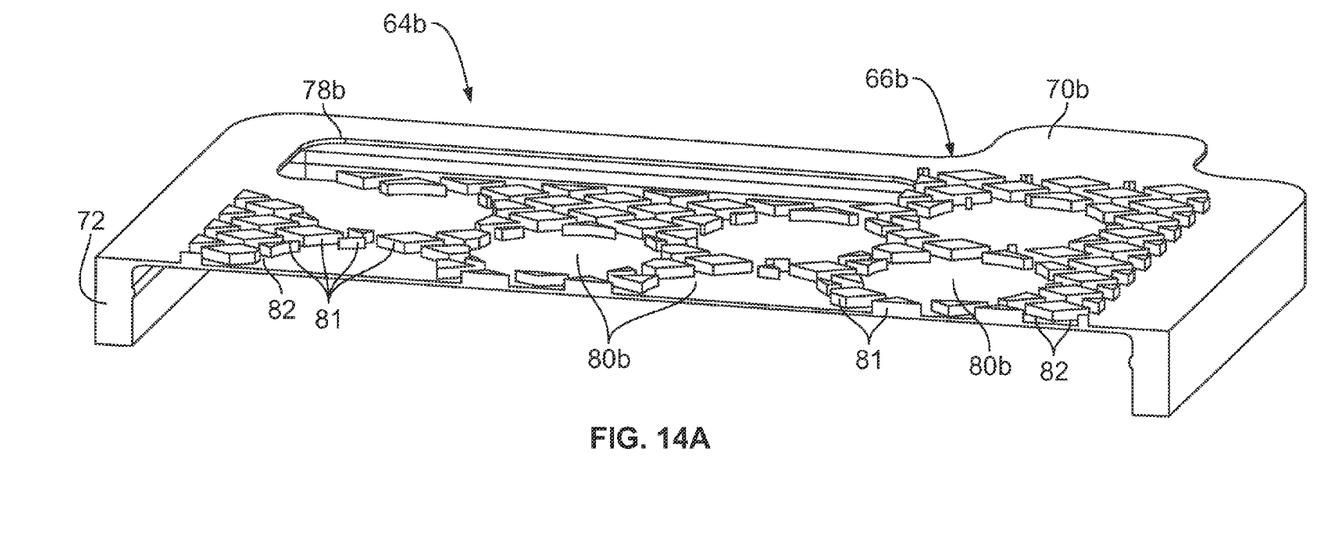
FIG. 14A is a cross-sectional perspective view of the gasket member of FIG. 14.
Figure 14B:
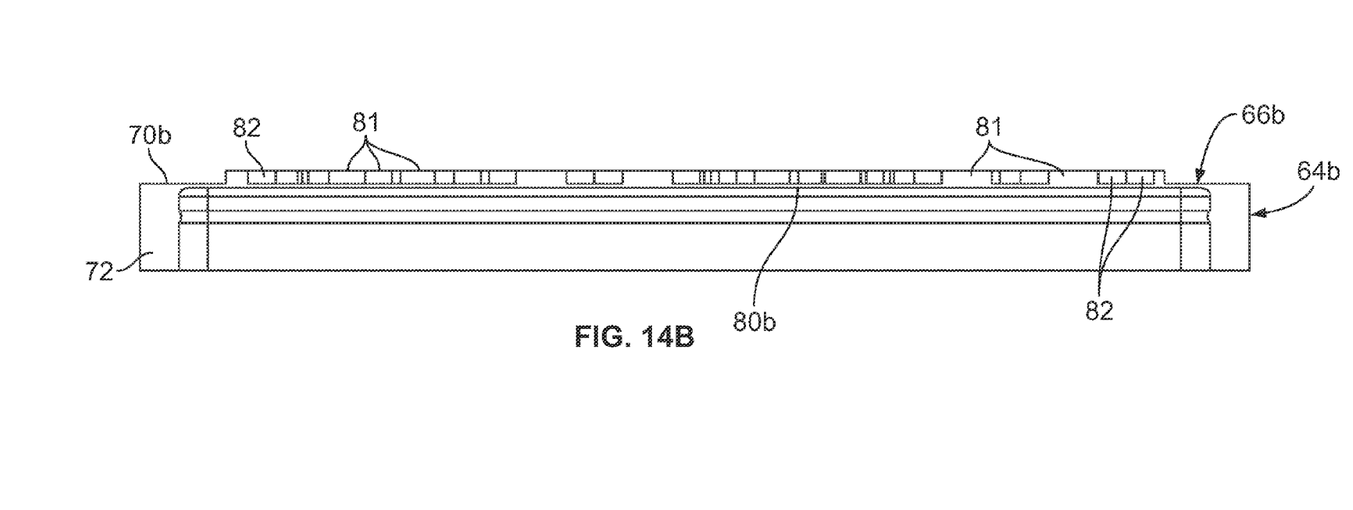
FIG. 14B is a cross-sectional end view of the gasket member of FIG. 14.

Similar to the embodiment of FIGS. 13-13B, the gasket member 64b of FIGS. 14-14B has a non-planar support layer 66b with a face 70b including a plurality of raised features 81 which define therebetween the discrete portions of support material 80b and network of channels 82 extending amongst the various discrete portions of support material 80b. However, the channels 82 shown in FIGS. 14-14B are much more numerous and more closely spaced together and are arranged in a criss-cross pattern defined by the generally diamond-shaped raised features 81. As in the embodiment of FIGS. 13-13B, the only openings in the face 70b are the windows 78b, with the channels 82 and discrete portions of support material 80b allowing air flow between the gasket member 64b and the cassette 16 at the required locations.

Figure 15:
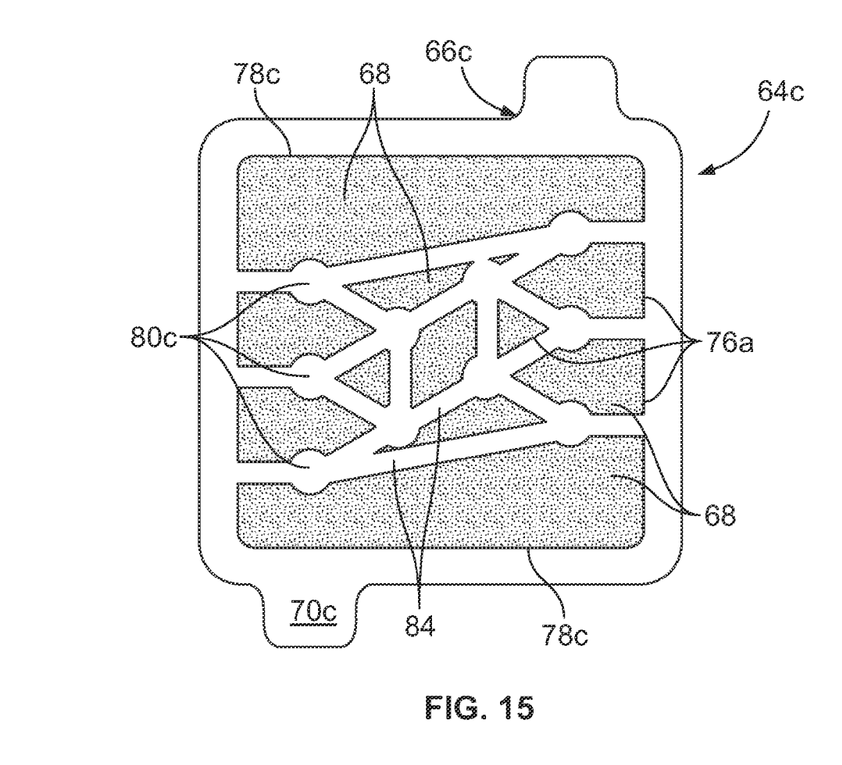
FIG. 15 is a front elevational view of yet another alternative embodiment of a gasket member according to the present disclosure.

In the embodiment of FIG. 15, the gasket member 64c has a support layer 66c with a face 70c missing most of its material and having several openings 76a and larger windows 78c. The discrete portions of support material 80c are connected to each other and the frame 72 by strips of support material 84. As a greater amount of the filter layer 68 is exposed, more suction will be applied to the cassette 16 by the vacuum port 62, bringing the cassette 16 into even better engagement with the valve assembly 54.

Figure 16:
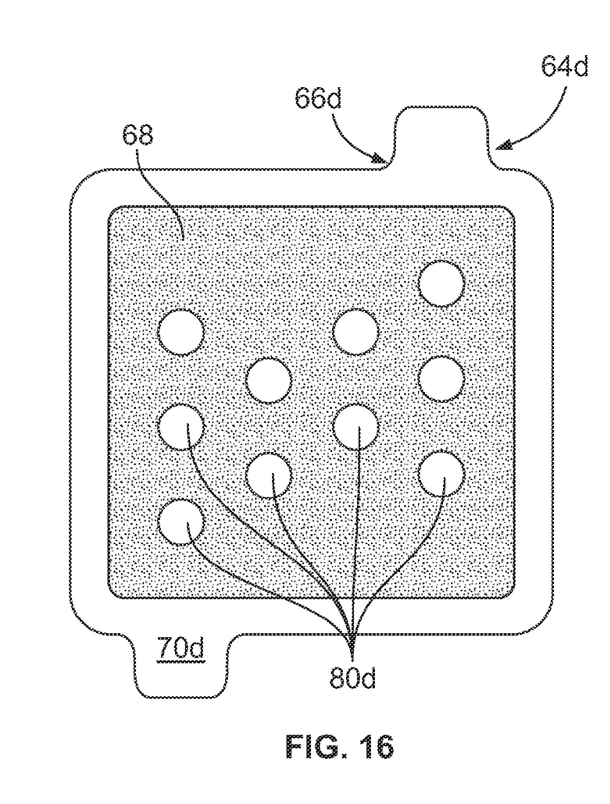
FIG. 16 is a front elevational view of another alternative embodiment of a gasket member according to the present disclosure.

The gasket member 64d of FIG. 16 is similar to the embodiment of FIG. 15, with a support layer 66d having a face 70d missing most of its material. Indeed, the only material of the support layer 66d present inward of its perimeter are the discrete portions of support material 80d. Instead, the filter layer 68 is secured to the frame 72 and the discrete portions of support material 80d are individually secured to the filter layer 68.

Figure 2:
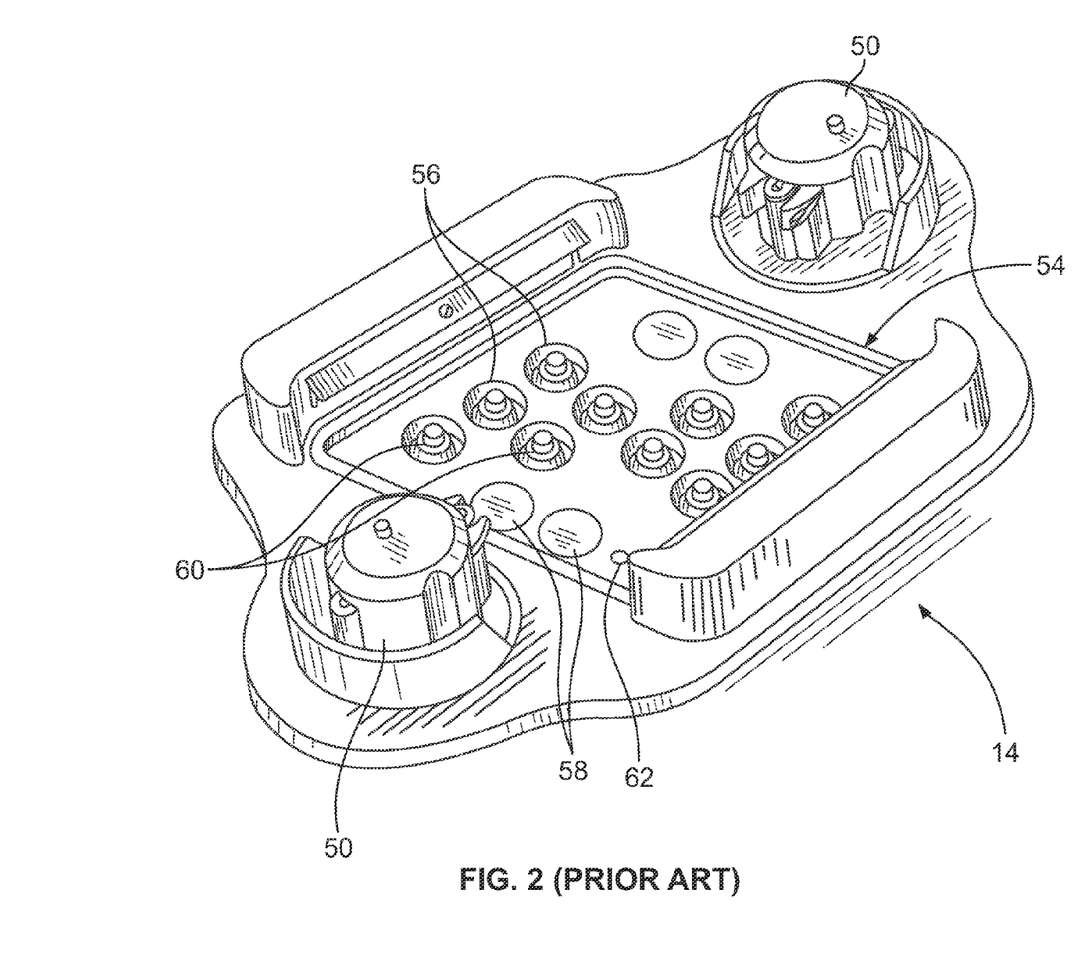
FIG. 2 is a perspective view of a cassette holder of the fluid processing system of FIG. 1.

The illustrated gasket members are configured for use with the cassette 16 and valve assembly 54 illustrated in FIGS. 2-4, but it will be understood that the principles described herein may be employed to provide gasket members suitable for use with differently configured cassettes and valve assemblies.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the gasket member alone, the gasket member in combination with the hardware or cassette, and/or the gasket member in combination with the hardware and cassette.

The invention claimed is:

1. A fluid processing cassette comprising:
a cassette body having first and second sides separated by an interior wall;
a diaphragm associated with one of the sides of the cassette body;
a plurality of valve stations positioned between the interior wall and the diaphragm in discrete locations; and
a gasket member associated with the diaphragm, the gasket member including
a filter layer; and
a support layer comprising a substantially planar face positioned between the diaphragm and the filter layer and present in discrete portions corresponding generally to the discrete locations of the valve stations of the cassette body, wherein the gasket member does not include the support layer in all or a portion of the region surrounding each of said discrete portions.

2. The fluid processing cassette of claim 1, wherein the face of the support layer comprises an underside of the gasket member and the filter layer covers substantially the entire underside of the face of the support layer.

3. The fluid processing cassette of claim 1, wherein the filter layer is comprised of a gas permeable, hydrophobic material and the support layer is comprised of an elastomeric material.

4. The fluid processing cassette of claim 1, wherein the support layer includes a frame, the frame extending along the perimeter of the face and extending in a direction generally orthogonal to the face.

5. The fluid processing cassette of claim 4, wherein the face and the frame of the support layer define a cavity and the filter layer is received within the cavity.

6. The fluid processing cassette of claim 1, wherein the support layer further comprises at least one opening adjacent to at least one of said discrete portions.

7. The fluid processing cassette of claim 1, wherein the support layer further comprises a plurality of openings adjacent to each of said discrete portions.

8. The fluid processing cassette of claim 1, wherein the support layer consists essentially of said discrete portions, a frame, and strips of material connecting said discrete portions to each other and/or the frame.

9. The fluid processing cassette of claim 1, wherein each valve station and each discrete portion of the support layer is generally circular.

10. A fluid processing cassette comprising:
a cassette body having first and second sides separated by an interior wall;
a diaphragm associated with one of the sides of the cassette body;
a plurality of valve stations positioned between the interior wall and the diaphragm in discrete locations; and
a gasket member associated with the diaphragm, the gasket member including
a filter layer; and
a support layer positioned between the diaphragm and the filter layer and present in discrete portions corresponding generally to the discrete locations of the valve stations of the cassette body, wherein the support layer has a non-planar face comprising a plurality of raised features defining channels which allow for the passage of air through the channels, and wherein the gasket member does not include the support layer in a plurality of window locations, with the channels allowing for the passage of air between the window locations, and with the air passing in the same plane as the raised features.

11. The fluid processing cassette of claim 10, wherein each valve station and each discrete portion of the support layer is generally circular.

12. The fluid processing cassette of claim 10, wherein at least one of said discrete portions of the support layer is in direct fluid communication with an adjacent discrete portion via a single channel.

13. The fluid processing cassette of claim 10, wherein at least one of said discrete portions of the support layer is in direct fluid communication with an adjacent discrete portion via a plurality of channels.

14. The fluid processing cassette of claim 10, wherein said raised features are in contact with the diaphragm.

15. A fluid processing cassette comprising:
a cassette body having first and second sides separated by an interior wall;
a diaphragm associated with one of the sides of the cassette body;
a plurality of valve stations positioned between the interior wall and the diaphragm in discrete locations; and
a gasket member associated with the diaphragm, the gasket member including
a filter layer; and
a support layer comprising a substantially planar face positioned between the diaphragm and the filter layer and present in discrete portions corresponding generally to the discrete locations of the valve stations of the cassette body, wherein the face of the support layer is present inward of a perimeter of the gasket member in only said discrete portions.

16. The fluid processing cassette of claim 15, wherein the face of the support layer comprises an underside of the gasket member and the filter layer covers substantially the entire underside of the face of the support layer.

17. The fluid processing cassette of claim 15, wherein the filter layer is comprised of a gas permeable, hydrophobic material and the support layer is comprised of an elastomeric material.

18. The fluid processing cassette of claim 15, wherein the perimeter of the gasket member is defined by the face and a frame, the frame extending along the perimeter of the face and extending in a direction generally orthogonal to the face.

19. The fluid processing cassette of claim 18, wherein the face and the frame of the support layer define a cavity and the filter layer is received within the cavity.

20. The fluid processing cassette of claim 15, wherein each valve station and each discrete portion of the support layer is generally circular.

* * * * *